J. H. Marston,
Camera Attachment.
Nº 13,093.   Patented June 19, 1855.

UNITED STATES PATENT OFFICE.

JOSEPH H. MARSTON, OF PHILADELPHIA, PENNSYLVANIA.

APPARATUS FOR TAKING STEREOSCOPIC PHOTOGRAPHS.

Specification forming part of Letters Patent No. 13,093, dated June 19, 1855.

*To all whom it may concern:*

Be it known that I, JOSEPH H. MARSTON, of the city and county of Philadelphia, and State of Pennsylvania, have invented certain new and useful Improvements in Daguerreotype Apparatus for Taking Stereoscopic Pictures; and I do hereby declare that the following is a full, clear, and exact description of the same, reference being had to the accompanying drawings, forming part of this specification, in which—

Figure 1:
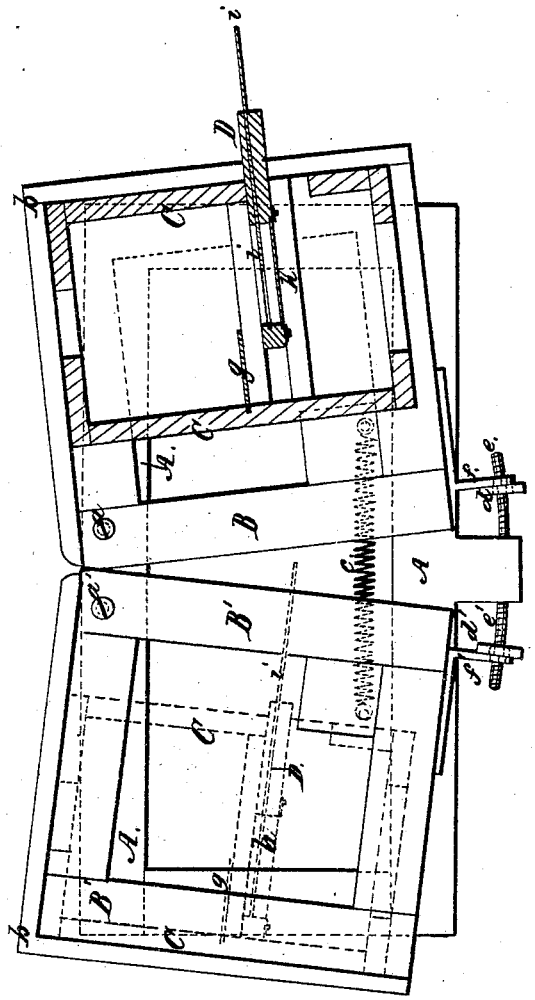
Figure 2:
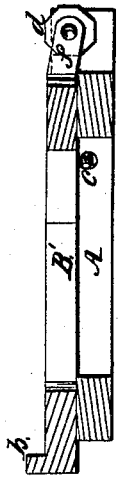

Figure 1 is a plan of a camera-board with the camera-box shown upon it in section, illustrating my invention. Fig. 2 is a vertical section of the camera-board.

Similar letters of reference indicate corresponding parts in both figures.

My invention consists, first, in an improvement in the camera board or stand, which enables the camera-box to be adjusted more expeditiously and exactly for taking stereoscopic pictures than it can be in the common way. It gives by its arranging the lenses of the camera-tube exactly the same distance each time, or (each picture from the object to be copied) the pictures both of the same size.

It further consists in an improvement in the camera-box whereby the taking of stereoscopic daguerreotypes is greatly expedited and the two pictures are enabled to be easily taken on the same plate.

To enable others skilled in the art to make and use my invention, I will proceed to describe its construction and operation.

A is a board or frame which is intended to be fixed upon or form part of the camera-stand, like the camera-board commonly employed.

B B' are two movable frames placed side by side upon the board or frame A, and pivoted thereto at $a$ $a'$, as near as convenient to its front and at about the middle of its length. These movable frames or boards are rather larger than the base of the camera-box. They have each a raised ledge, $b$, extending all along its front and outer sides, which serves as a guide against which to place the camera-box in operating. They are connected together by a spring, $c$, underneath the back part, which tends to draw them toward each other to a parallel position; but they are forced apart for the purpose of adjusting them at any required angle to each other by means of two nuts, $d$ $d$, applied to two fixed screws, $e$ $e$, at the back of the frame A, the said nuts bearing on the inner sides of two eye-plates, $ff$, secured to the frames B B' in such positions as to allow the screws $e$ $e$ to pass through them, and the spring $c$ serving to hold the frames B B' secure in any position in which they may be adjusted.

C is the camera-box, which is represented on the frame B in black outline and on the frame B' in red outline. It is of the usual construction, except that it has an additional shutter, $g$, placed a short distance in front of the slide and extending from one side so far across the box as to be capable of covering half of the daguerreotype-plate $h$, as is shown where the camera-box is represented in red outline with the slide D pushed all the way across the box. The slide is so constructed that it will allow one half of the plate to include or be within the field of view, while the other is shaded behind the shutter $g$.

In proceeding to operate the daguerreotypist first brings the two frames B B' close together or parallel with the frame A, and then places the camera-box over the center of the frame A, close up to the ledge $b$. He then adjusts the camera-stand to such a position as to bring the subject in the field of the lens, and, having done this, moves the camera-box over on the frame B', close to the ledge $b$, and adjusts the frame, by means of the nut $d$, to bring the subject within the field of the lens, and then adjusts the lens to bring the subject in focus. He then moves the camera over to the other frame, B, and adjusts the said frame to bring the subject in the field, keeping the same part of the subject within the center of the field, as he did in the other position of the camera-box. The first picture is taken with the camera on the frame B. The plate is fixed in the plate-holder or slide D, which is then inserted in the camera-box to a proper distance, which may be indicated by a mark on the outside, to bring the middle of the first half of the plate into the middle of the field. To take the picture, the shutter $i$ of the slide is only drawn out to the proper distance, which may be shown by a mark upon it, to expose the first half of the plate. When this picture is taken, the camera is immediately moved over to the frame or table B' and the slide D pushed in all the way, or far enough to bring the first half of the plate upon which the picture has been taken behind the shutter $g$ and to bring the next half into the field. To take this picture, the shutter $i$ of the slide is drawn all the way out. In order to take different-sized pictures in the same camera, different-sized shutters $g$ will have to be employed, a larger picture requiring a smaller shutter, and vice versa, in order to shade and expose a proper portion of the plate; but, except for the purpose of changing the size, the shutter $g$ may be considered as a fixture.

The two stereoscopic pictures are taken by the aid of this invention in very little more time than is usually occupied in taking one, besides which they are taken with greater correctness. In taking the two upon the same plate a more perfect degree of uniformity of tone is produced than when taken on separate plates, as is now commonly practiced, as it is almost impossible to obtain two plates which have been coated exactly alike, and one will sometimes produce a dark and the other a light picture. This method saves the trouble and great amount of time used in placing the two pictures in the stereoscopic cases, as when two plates are used they require to be placed in a certain place and position or they will not produce the effects desired.

I do not claim the using of guides or frames or angles on a camera-board, as such have been used heretofore; but What I do claim as my invention, and desire to secure by Letters Patent, is—

1. The particular arrangement of two frames or guides or boards that shall work on and be fastened or pivoted on the camera-board A at the center and front of the camera-board A at $a$ $a'$, the frames or guides to be at right angles, so that when closed together they form the raised ledge $b$ $b'$ parallel with each other, by which to adjust and center the angle-board A previous to setting the angles for stereoscoping, also the application of the spring C to hold the frames together, the right and left screws $e$ $e'$, and nuts $d$ $d'$, and eye-plates $f$ $f'$, to force apart and hold the frames B B' in any desired angle.

2. The above-described apparatus for moving the camera box and giving the true stereoscope angle at one and the same time.

JOSEPH H. MARSTON.

Witnesses:
   GEO. C. GEYER,
   JOHN MARSTON.